United States Patent
Madurai Kumar et al.

(10) Patent No.: US 9,096,207 B2
(45) Date of Patent: Aug. 4, 2015

(54) HYBRID VEHICLE POWERTRAIN COOLING SYSTEM

(75) Inventors: Mahesh Madurai Kumar, Columbus, IN (US); Morgan M. Andreae, Columbus, IN (US)

(73) Assignee: Cummins Inc., Indianapolis, IN (US)

( * ) Notice: Subject to any disclaimer, the term of this patent is extended or adjusted under 35 U.S.C. 154(b) by 0 days.

(21) Appl. No.: 13/212,860

(22) Filed: Aug. 18, 2011

(65) Prior Publication Data

US 2012/0173063 A1    Jul. 5, 2012

Related U.S. Application Data

(63) Continuation of application No. 12/982,990, filed on Dec. 31, 2010, now abandoned.

(51) Int. Cl.
*B60L 9/00* (2006.01)
*B60L 11/00* (2006.01)
(Continued)

(52) U.S. Cl.
CPC ............... *B60W 10/02* (2013.01); *B60W 10/06* (2013.01); *B60W 10/08* (2013.01); *B60W 10/26* (2013.01); *B60W 20/00* (2013.01); *B60K 6/48* (2013.01); *B60W 2710/0688* (2013.01);
(Continued)

(58) Field of Classification Search
CPC .................. F01P 5/00; F01P 5/10; F01P 5/12; F01P 2005/105; F01P 2005/125; F01P 2050/24
USPC ............. 123/41.31, 41.44, 41.01; 165/41, 42, 165/296; 180/65.21, 65.22, 65.256, 65.27, 180/68.1, 68.2, 68.6; 701/22; 903/905, 930
See application file for complete search history.

(56) References Cited

U.S. PATENT DOCUMENTS

| | | | |
|---|---|---|---|
| 3,566,717 A | 3/1971 | Berman et al. |
| 3,732,751 A | 5/1973 | Berman et al. |

(Continued)

FOREIGN PATENT DOCUMENTS

| | | |
|---|---|---|
| JP | 58098658 | 6/1983 |
| JP | 2007032494 | 2/2007 |
| WO | 2011023261 | 3/2011 |

OTHER PUBLICATIONS

Husain, Electric and Hybrid Vehicles: Design Fundamentals, 2005, Taylor & Francis e-Library, 2005, p. 436.*

(Continued)

*Primary Examiner* — Yonel Beaulieu
*Assistant Examiner* — Lail Kleinman
(74) *Attorney, Agent, or Firm* — Taft Stettinius & Hollister LLP

(57) ABSTRACT

Some exemplary embodiments include a hybrid vehicle cooling system comprising a closed loop coolant flowpath including a valve operable to direct coolant flow to an internal combustion engine or to an internal combustion engine bypass, a thermostat operable to direct coolant flow from the internal combustion engine or the internal combustion engine bypass to a radiator or a radiator bypass, a plurality of hybrid powertrain components positioned in parallel to receive coolant flow from the radiator or the radiator bypass, a mechanically driven coolant pump operable to pump coolant through the closed loop coolant flowpath, and an electrically driven coolant pump operable to pump coolant through the closed loop coolant flowpath. Additional exemplary embodiments include methods of operation and/or control of hybrid vehicle cooling systems.

19 Claims, 3 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 10/02* (2006.01)
*B60W 10/06* (2006.01)
*B60W 10/08* (2006.01)
*B60W 10/26* (2006.01)
*B60W 20/00* (2006.01)
*B60K 6/48* (2007.10)
*F01P 5/10* (2006.01)
*F01P 5/12* (2006.01)

(52) U.S. Cl.
CPC .... *F01P 2005/105* (2013.01); *F01P 2005/125* (2013.01); *F01P 2050/24* (2013.01); *Y02T 10/6221* (2013.01); *Y02T 10/6286* (2013.01)

(56) References Cited

U.S. PATENT DOCUMENTS

| | | | |
|---|---|---|---|
| 3,923,115 A | 12/1975 | Helling | |
| 4,021,677 A | 5/1977 | Rosen et al. | |
| 4,099,589 A | 7/1978 | Williams | |
| 4,165,795 A | 8/1979 | Lynch et al. | |
| 4,233,858 A | 11/1980 | Rowlett | |
| 4,305,254 A | 12/1981 | Kawakatsu et al. | |
| 4,335,429 A | 6/1982 | Kawakatsu | |
| 4,405,029 A | 9/1983 | Hunt | |
| 4,407,132 A | 10/1983 | Kawakatsu et al. | |
| 4,438,342 A | 3/1984 | Kenyon | |
| 4,489,242 A | 12/1984 | Worst | |
| 4,532,894 A * | 8/1985 | Wulf et al. | 123/142.5 E |
| 4,588,040 A | 5/1986 | Albright, Jr. et al. | |
| 4,771,739 A | 9/1988 | Hapka | |
| 4,935,689 A * | 6/1990 | Fujikawa et al. | 322/1 |
| 5,251,588 A | 10/1993 | Tsujii et al. | |
| 5,255,733 A * | 10/1993 | King | 165/299 |
| 5,323,868 A | 6/1994 | Kawashima | |
| 5,327,992 A | 7/1994 | Boll | |
| 5,358,317 A | 10/1994 | Cikanek | |
| 5,403,244 A | 4/1995 | Tankersley et al. | |
| 5,428,274 A | 6/1995 | Furutani et al. | |
| 5,433,282 A | 7/1995 | Moroto et al. | |
| 5,492,189 A | 2/1996 | Kriegler et al. | |
| 5,513,719 A | 5/1996 | Moroto et al. | |
| 5,531,285 A | 7/1996 | Green | |
| 5,558,173 A | 9/1996 | Sherman | |
| 5,558,595 A | 9/1996 | Schmidt et al. | |
| 5,562,565 A | 10/1996 | Moroto et al. | |
| 5,635,805 A | 6/1997 | Ibaraki et al. | |
| 5,643,119 A | 7/1997 | Yamaguchi et al. | |
| 5,650,931 A | 7/1997 | Nii | |
| 5,713,425 A | 2/1998 | Buschhaus et al. | |
| 5,722,502 A | 3/1998 | Kubo | |
| 5,755,303 A | 5/1998 | Yamamoto et al. | |
| 5,762,156 A | 6/1998 | Bates et al. | |
| 5,775,449 A | 7/1998 | Moroto et al. | |
| 5,778,326 A | 7/1998 | Moroto et al. | |
| 5,788,006 A | 8/1998 | Yamaguchi | |
| 5,789,881 A | 8/1998 | Egami et al. | |
| 5,832,396 A | 11/1998 | Moroto et al. | |
| 5,845,731 A | 12/1998 | Buglione et al. | |
| 5,846,155 A | 12/1998 | Taniguchi et al. | |
| 5,864,771 A | 1/1999 | Yokoyama et al. | |
| 5,865,263 A | 2/1999 | Yamaguchi et al. | |
| 5,892,346 A | 4/1999 | Moroto et al. | |
| 5,908,077 A | 6/1999 | Moore | |
| 5,924,406 A | 7/1999 | Kinugasa et al. | |
| 5,971,092 A | 10/1999 | Walker | |
| 6,009,365 A | 12/1999 | Takahara et al. | |
| 6,019,699 A | 2/2000 | Hoshiya et al. | |
| 6,026,921 A | 2/2000 | Aoyama et al. | |
| 6,032,869 A * | 3/2000 | Ito et al. | 237/12.3 B |
| 6,070,650 A | 6/2000 | Inoue et al. | |
| 6,082,626 A * | 7/2000 | Morikawa et al. | 237/12.3 B |
| 6,223,842 B1 | 5/2001 | Masaki | |
| 6,223,846 B1 | 5/2001 | Schechter | |
| 6,251,042 B1 | 6/2001 | Peterson et al. | |
| 6,300,858 B1 | 10/2001 | Kalapodis et al. | |
| 6,334,079 B1 | 12/2001 | Matsubara et al. | |
| 6,374,780 B1 | 4/2002 | Rutyna et al. | |
| 6,404,636 B1 | 6/2002 | Staggers et al. | |
| 6,452,286 B1 | 9/2002 | Kubo et al. | |
| 6,464,028 B1 | 10/2002 | Imani | |
| 6,487,477 B1 | 11/2002 | Woestman et al. | |
| 6,501,190 B1 | 12/2002 | Seguchi et al. | |
| 6,515,872 B2 | 2/2003 | Nakayama et al. | |
| 6,570,749 B1 | 5/2003 | Ling et al. | |
| 6,573,687 B2 | 6/2003 | Kimura et al. | |
| 6,598,496 B2 | 7/2003 | Pannell | |
| 6,601,545 B1 * | 8/2003 | Hohl | 123/41.31 |
| 6,607,142 B1 * | 8/2003 | Boggs et al. | 237/12.3 B |
| 6,647,961 B2 | 11/2003 | Suzuki et al. | |
| 6,668,953 B1 | 12/2003 | Reik et al. | |
| 6,725,679 B2 | 4/2004 | Itoh et al. | |
| 6,807,931 B2 | 10/2004 | Taylor et al. | |
| 6,810,977 B2 | 11/2004 | Suzuki | |
| 6,863,139 B2 | 3/2005 | Egami et al. | |
| 6,887,180 B2 | 5/2005 | Pels et al. | |
| 6,915,629 B2 | 7/2005 | Szymkowicz | |
| 6,928,807 B2 | 8/2005 | Jacob et al. | |
| 7,024,858 B2 | 4/2006 | Gray, Jr. | |
| 7,104,920 B2 | 9/2006 | Beaty et al. | |
| 7,114,585 B2 | 10/2006 | Man et al. | |
| 7,119,454 B1 | 10/2006 | Chiao | |
| 7,188,020 B2 | 3/2007 | Yasui et al. | |
| 7,276,815 B2 | 10/2007 | Algrain et al. | |
| 7,303,504 B2 | 12/2007 | Uchisasai et al. | |
| 7,360,615 B2 | 4/2008 | Salman et al. | |
| 7,370,612 B2 | 5/2008 | Hanai | |
| 7,377,237 B2 | 5/2008 | Carney et al. | |
| 7,391,129 B2 | 6/2008 | Chiao et al. | |
| 7,392,871 B2 | 7/2008 | Severinsky et al. | |
| 7,411,312 B2 | 8/2008 | Chiao | |
| 7,448,458 B2 | 11/2008 | Meyer | |
| 7,455,134 B2 | 11/2008 | Severinsky et al. | |
| 7,492,055 B2 | 2/2009 | Chiao | |
| 7,520,353 B2 | 4/2009 | Severinsky et al. | |
| 7,568,539 B2 | 8/2009 | Abe et al. | |
| 7,572,201 B2 | 8/2009 | Supina et al. | |
| 7,578,363 B2 | 8/2009 | Kim | |
| 7,582,034 B2 | 9/2009 | Usoro | |
| 7,582,980 B2 | 9/2009 | Motoike et al. | |
| 7,823,669 B2 | 11/2010 | Bandai et al. | |
| 2001/0045103 A1 * | 11/2001 | Khelifa | 62/244 |
| 2003/0116368 A1 | 6/2003 | Winkelman et al. | |
| 2003/0127528 A1 * | 7/2003 | Sabhapathy et al. | 237/12.3 B |
| 2003/0230996 A1 * | 12/2003 | Gabriel et al. | 318/599 |
| 2004/0069546 A1 * | 4/2004 | Lou et al. | 180/65.2 |
| 2004/0219409 A1 * | 11/2004 | Isogai | 429/26 |
| 2006/0101809 A1 | 5/2006 | Bodo et al. | |
| 2007/0112475 A1 | 5/2007 | Koebler et al. | |
| 2007/0225888 A1 | 9/2007 | Morris | |
| 2007/0245737 A1 | 10/2007 | Inaba et al. | |
| 2007/0289291 A1 | 12/2007 | Rabinovich et al. | |
| 2008/0039263 A1 | 2/2008 | Usoro | |
| 2008/0051242 A1 | 2/2008 | Usoro | |
| 2008/0099256 A1 | 5/2008 | Holmes et al. | |
| 2008/0103679 A1 | 5/2008 | Ruiz | |
| 2008/0242498 A1 | 10/2008 | Miller et al. | |
| 2008/0251303 A1 * | 10/2008 | Rouaud et al. | 180/65.2 |
| 2008/0257311 A1 | 10/2008 | Spicer et al. | |
| 2009/0115491 A1 | 5/2009 | Anwar et al. | |
| 2009/0118090 A1 | 5/2009 | Heap et al. | |
| 2009/0118969 A1 | 5/2009 | Heap et al. | |
| 2009/0139686 A1 | 6/2009 | Suzuki | |
| 2009/0188450 A1 | 7/2009 | Kline et al. | |
| 2009/0195203 A1 | 8/2009 | Yurgil | |
| 2009/0197727 A1 | 8/2009 | Janson | |
| 2009/0197728 A1 | 8/2009 | Janson | |
| 2009/0199553 A1 | 8/2009 | Nishimura et al. | |
| 2009/0200094 A1 | 8/2009 | Zohrer et al. | |

(56) References Cited

U.S. PATENT DOCUMENTS

| | | |
|---|---|---|
| 2009/0200095 A1 | 8/2009 | Kawasaki |
| 2009/0205588 A1 | 8/2009 | Bilezikjian et al. |
| 2009/0205886 A1 | 8/2009 | Supina et al. |
| 2009/0209146 A1 | 8/2009 | Jegel |
| 2009/0209381 A1 | 8/2009 | Ai et al. |
| 2009/0221390 A1 | 9/2009 | Houle |
| 2009/0223727 A1 | 9/2009 | Tolksdorf |
| 2009/0324453 A1 | 12/2009 | Harinath et al. |
| 2010/0139582 A1* | 6/2010 | Bilezikjian et al. ........ 123/41.02 |
| 2010/0270874 A1 | 10/2010 | Stervik et al. |
| 2011/0132291 A1* | 6/2011 | Ulrey et al. .................. 123/41.1 |
| 2012/0160581 A1* | 6/2012 | Hoess .......................... 180/68.1 |

OTHER PUBLICATIONS

Notification of Transmittal of the International Search Report and the Written Opinion of the International Searching Authority, or the Declaration, International Application No. PCT/US2011/067678, Jul. 13, 2012, 11 pages.

* cited by examiner

HYBRID VEHICLE POWERTRAIN COOLING SYSTEM

CROSS REFERENCE TO RELATED APPLICATIONS

The present application is a continuation of U.S. patent application Ser. No. 12/982,990 filed on Dec. 31, 2010 now abandoned, which is incorporated herein by reference.

BACKGROUND

The present application relates to a cooling system for a hybrid vehicle, and more particularly, but not exclusively, to a hybrid electric powertrain cooling system. A hybrid electric powertrain is typically one that derives power to propel a vehicle from either or both of an internal combustion engine and an electric propulsion system. Such a system may include multiple powertrain components, for example, an engine, one or more motor/generators, power electronics such as one or more inverters or converters, one or more energy storage systems, one or more DC-DC converters, and one or more clutches. These and other hybrid vehicle components are capable of rejecting heat and may require cooling. Present approaches to hybrid cooling systems suffer from a variety of limitations and problems including those respecting cost, complexity, and efficiency among others. There is a need for the unique and inventive methods, systems and apparatuses disclosed herein.

SUMMARY

Some exemplary embodiments include a hybrid vehicle cooling system comprising a closed loop coolant flowpath including a valve operable to direct coolant flow to an internal combustion engine or to an internal combustion engine bypass, a thermostat operable to direct coolant flow from the internal combustion engine or the internal combustion engine bypass to a radiator or a radiator bypass, a plurality of hybrid powertrain components positioned in parallel to receive coolant flow from the radiator or the radiator bypass, a mechanically driven coolant pump operable to pump coolant through the closed loop coolant flowpath, and an electrically driven coolant pump operable to pump coolant through the closed loop coolant flowpath. Some exemplary embodiments include methods of operation and/or control of hybrid vehicle cooling systems. Further embodiments, forms, objects, features, advantages, aspects, and benefits shall become apparent from the following description and drawings.

DETAILED DESCRIPTION

For purposes of promoting an understanding of the principles of the invention, reference will now be made to the exemplary embodiments illustrated in the figures and specific language will be used to describe the same. It will nevertheless be understood that no limitation of the scope of the invention is thereby created, and that the invention includes and protects such alterations and modifications to the illustrated embodiments, and such further applications of the principles of the invention illustrated therein as would occur to one skilled in the art to which the invention relates.

Figure 1:
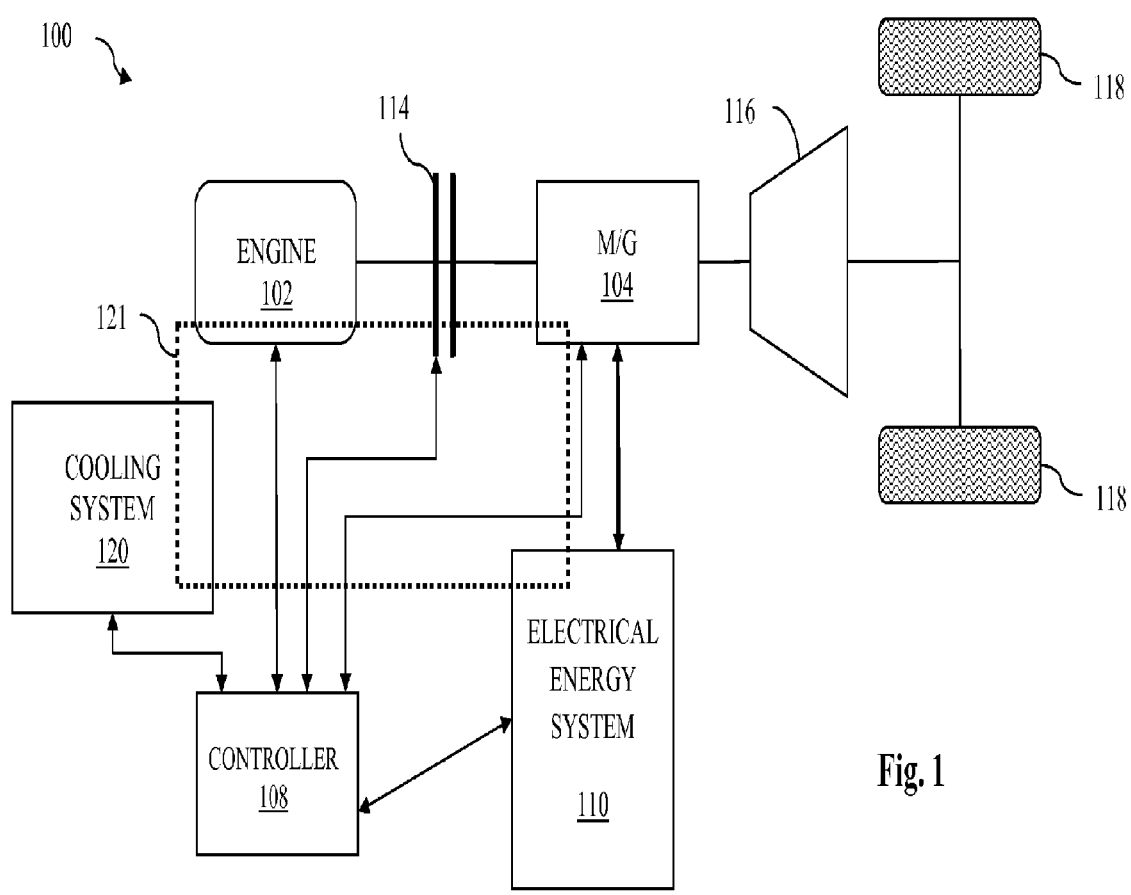
FIG. 1 is a schematic diagram illustrating a hybrid vehicle propulsion system including an exemplary cooling system.

FIG. 1 illustrates a hybrid vehicle system 100 including an internal combustion engine 102 and a motor/generator 104 which are selectably coupled to one another by a controllable clutch 114. Motor/generator 104 is electrically coupled with an electrical energy system 110 which includes one or more power electronics devices operable to convert electrical power received from motor/generator 104 for storage in a battery and draw power from the battery to drive motor/generator 104. It shall be understood that the battery may include a number of devices, for example, battery banks, battery packs, as well as ultracapacitors and other energy storage devices. For simplicity, however, the term battery is used to inclusively describe these possibilities. Likewise, the power electronics of the electrical energy system 110 may include one or more busses, inverters, AC/DC converters, DC/DC converters, and other power electronics operable to distribute or convert electrical power.

The powertrain of hybrid vehicle system 100 may be operated in different vehicle propulsion modes so that engine 102, motor/generator 104, or both engine 102 and motor/generator 104 provide torque to a transmission 116 which, in turn, provides torque to the drive wheels 118 of the hybrid vehicle. The powertrain of hybrid vehicle system 100 may also be operated so that engine 102 drives motor/generator 104 to recharge the battery. The powertrain of hybrid vehicle system 100 may further be operated in a regenerative braking mode in which the motor/generator 104 receives torque from the vehicle wheels 118 and generates power to recharge the battery. It shall be understood that the powertrain of hybrid vehicle system 100 is an exemplary configuration and that additional embodiments contemplate other hybrid powertrain configurations including, for example, series hybrid powertrain configurations, parallel hybrid powertrain configurations, series-parallel hybrid powertrain configurations, and power-split hybrid configurations. Furthermore, it shall be understood that additional torque transfer devices for example, torque converters, gear splitters, differentials, deep reduction gears, and/or other devices may be included in the torque path between engine 102, motor/generator 104 and vehicle wheels 118 or in other locations.

Hybrid vehicle system 100 further includes a cooling system 120 including a coolant flowpath 121 which is in thermal communication with internal combustion engine 102, clutch 114, motor/generator 104 and one or more components of electrical energy system 110 and is operable to provide heat transfer between those components and the coolant. In exemplary embodiments thermal communication is provided by a coolant flowpath passing through one or more flow passages provided in a component or a component housing. In further exemplary embodiments thermal communication is provided by a coolant flowpath passing through a separate structure in contact with a component or its housing. In further exemplary embodiments thermal communication is provided by a heat transfer device intermediate the coolant flowpath and the component or its housing. Coolant flowpath 121 is preferably a closed loop flowpath and may include one or more vents, bleed valves, ports or safety valves, but additional embodiments may also include other types of coolant flowpaths. Cooling system 120 further includes a radiator, a thermostat, and a fan which are operable to selectably transfer heat from coolant flowing through cooling system 120 to ambient. Cooling system 120 further includes one or more coolant pumps which may be electrically driven, mechanically driven and may include both an electrically driven and a mechanically driven pump.

Hybrid vehicle system 100 also includes a controller 108 which is coupled to and operable to control the operation of engine 102, motor/generator 104, electrical energy system 110, cooling system 120 and other components and systems of hybrid vehicle system 100, as well as to receive information from such components and systems or from sensors provided therewith. Controller 108 preferably includes one or more microprocessors, digital memories, ASICS and/or other integrated circuitry or logic devices. For simplicity controller 108 is illustrated as a single unit, but it shall be understood that multiple controllers, control units or control modules units may be utilized to perform the control functions described herein.

Figure 2:
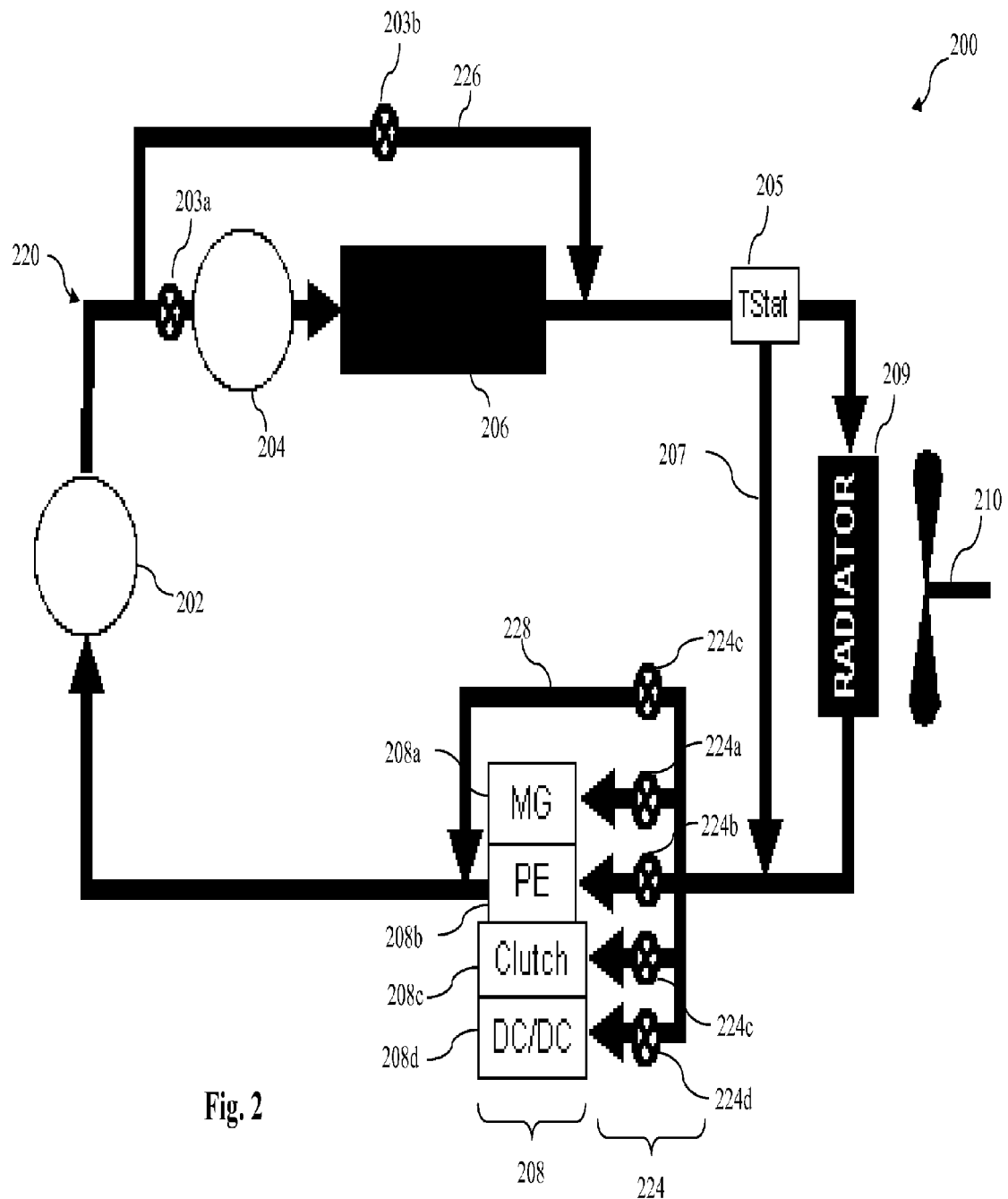
FIG. 2 is a schematic diagram illustrating an exemplary cooling system for a hybrid vehicle propulsion system.

FIG. 2 illustrates an exemplary cooling system 200 for a hybrid vehicle which may be used in the hybrid vehicle system 100 described above in connection with FIG. 1 or in other hybrid vehicle systems including, for example, the alternatives and additions described herein. Cooling system 200 includes an electric coolant pump 202 and a mechanical coolant pump 204 which are operable to pump coolant through a closed loop coolant flowpath 220. Electric coolant pump 202 is driven by electrical power from a hybrid vehicle electrical energy system and is operatively connected to a controller which controls its operation. Mechanical coolant pump 204 is driven mechanically with torque from engine 206. In certain operating modes, cooling system 200 may pump coolant through coolant flowpath 220 using electrical coolant pump 202 alone, for example, when engine 206 is turned off. In other operating modes, cooling system 200 may pump coolant through coolant flowpath 220 using mechanical coolant pump 204 alone, for example, when engine 206 is turned on and the mechanical coolant pump 204 is capable of providing a desired coolant flow rate. In further operating modes, cooling system 200 may pump coolant through coolant flowpath 220 using electrical coolant pump 202 and mechanical coolant pump 204, for example, when engine 206 is turned on and the desired coolant flow rate requires the use of both electrical coolant pump 202 and mechanical coolant pump 204. Utilizing multiple operating modes, cooling system 200 is operable to provide coolant flow through closed loop coolant flowpath 220 during all modes of hybrid vehicle operation including modes where engine 206 is on or running and modes where engine 206 is off or shut down.

Certain exemplary embodiments including an electrical coolant pump and a mechanical coolant pump allow the mechanical coolant pump to be downsized or to have a reduced pumping capacity relative to the capacity required to provide a desired coolant flow rate or a maximum coolant flow rate required by a cooling system. The coolant pump may thereby be sized to reduce parasitic losses on the engine. In one exemplary embodiment, the mechanical coolant pump may be configured to meet an average coolant flow requirement which is less than the maximum coolant flow requirement. The cooling system may be controlled to allow the electrical coolant pump to assist the mechanical coolant pump when coolant flow requirements exceed the average coolant flow requirement and the mechanical coolant pump is inadequate to meet the desired or required coolant flow.

Cooling system 200 includes controllable valves 203*a* and 203*b* which are operatively connected to a controller and are operable to selectably direct coolant flow through engine 206 or engine bypass 226. In certain embodiments a single valve may be operatively connected to a controller and operable to selectably direct coolant flow through engine 206 or engine bypass 226. Cooling system 200 further includes a thermostat 205 which is operable to direct coolant flowing from engine 206 or engine bypass 226 to flow through radiator 209 or radiator bypass 207. Thermostat 205 may be a passive thermostat, such as a wax thermostat, or an actively controlled thermostat such as an electrically controlled thermostat. Radiator 209 is operable to transfer heat from coolant flowing therethrough to the ambient environment and an electrically driven fan 210 operatively connected to a controller is controllable to increase or decrease the rate of heat transfer by controllably directing ambient air across radiator 209. Radiator 209 is common to and provides heat transfer to ambient for all devices and components which transfer heat to coolant flowing through coolant flowpath 220. As illustrated in FIG. 2 these devices include engine 206 and hybrid powertrain components 208 which are described in further detail below. It shall be understood that additional or alternate hybrid powertrain components may also be cooled by cooling system 200.

Cooling system 200 includes a plurality of valves 224*a*, 224*b*, 224*c*, 224*d*, and 224*e* (collectively denoted with bracket 224) which are operable to direct coolant flow to a corresponding plurality of hybrid powertrain components 208*a*, 208*b*, 208*c* and 208*d* (collectively denoted with bracket 208) and hybrid powertrain component bypass 228. Valves 224 may be actively controlled or may be passive devices, for example, restricted orifices which passively control the flow of coolant to an associated hybrid powertrain component. In the embodiment illustrated in FIG. 2, component 208*a* is a motor/generator, component 208*b* is an inverter, component 208*c* is a clutch, and component 208*d* is a DC/DC converter. It shall be understood that additional and alternate hybrid powertrain components which produce heat and require cooling may also be present in addition to or instead of the illustrated components. As illustrated in FIG. 2 hybrid powertrain components 208 and hybrid powertrain component bypass 228 along with their associated valves are positioned in parallel relationship to one another relative to coolant flow in closed loop coolant flowpath 220. Additional embodiments contemplate other locations for hybrid powertrain components 208 relative to one another and relative to the other components of cooling system 200 including, for example, series flow relationship of various orders.

Figure 3:
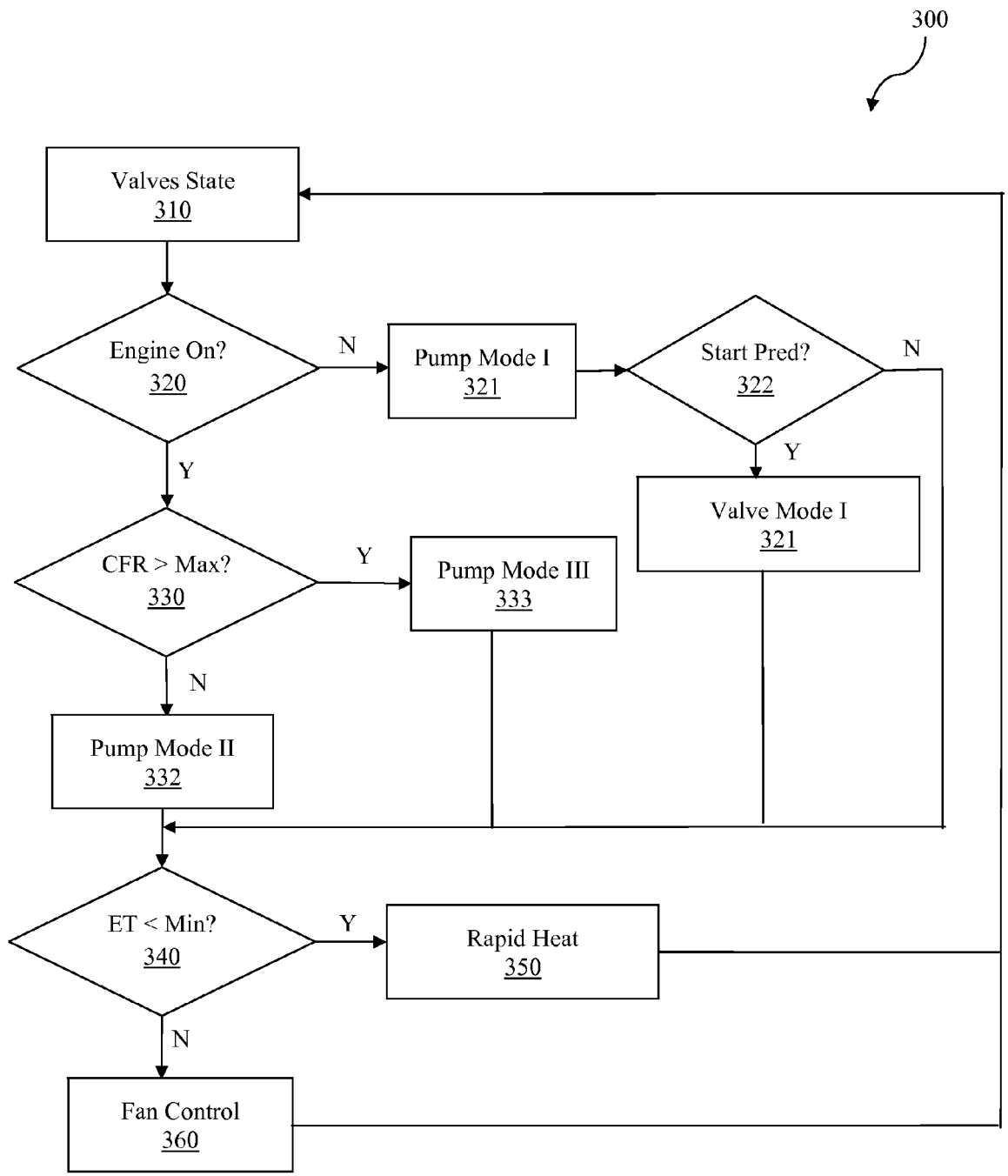
FIG. 3 is a flowchart illustrating an exemplary control procedure for a cooling system for a hybrid vehicle propulsion system.

FIG. 3 illustrates an exemplary procedure 300 executable by one or more controllers to control operation of a cooling system for a hybrid vehicle system. The hybrid vehicle system may be hybrid vehicle system 100 described above in connection with FIG. 1 where controller 108 is configured with software, firmware, hardware or combinations thereof operable to execute procedure 300. Procedure 300 may also be utilized in connection with other hybrid vehicle systems and controllers including, for example, the alternatives and additions described herein. The cooling system may be cooling system 200 described above in connection with FIG. 2, or other cooling systems including, for example, the alternatives and additions described herein.

Procedure 300 begins at valves state operation 310 which performs one or more tests and valve control operations to confirm that one or more controllable valves in the coolant flowpath are positioned appropriately for the current operating state of the system and/or command any required adjustments or setting of the controllable valves. The valve control operations may include tests of engine operation, coolant temperature, and temperature of one or more hybrid powertrain components and commands to adjust valves to direct coolant flow to the engine or engine bypass, hybrid powertrain components or hybrid powertrain components bypass, and/or radiator or radiator bypass (in the case of an actively controlled thermostat). From start state 310, procedure 300 continues to conditional 320.

Conditional 320 tests whether the engine of a hybrid vehicle is on. This determination may be made by testing whether the engine is operating and/or starting. If conditional 320 determines that the engine is not on, procedure 320 continues to operation 321 which provides mode I pump operation. In mode I pump operation, coolant is circulated using an electrical coolant pump. The rate of coolant flow provided by the electrical coolant pump may be controlled based upon the temperature of one or more hybrid powertrain components, the coolant temperature or other variables to provide coolant flow effective to provide the desired cooling of the hybrid powertrain components which are cooled by the cooling system.

From operation 321 procedure 300 continues to conditional 322 which determines whether an engine start is predicted. This determination may be based upon power output or torque demands such as commanded torque, the state of charge of a battery or electrical storage device and other variables which determine whether the engine will operate to provide torque for vehicle propulsion and/or charging a battery or other electrical storage device. If conditional 322 determines that an engine start is predicted, procedure 322 continues to operation 321. Operation 321 controls one or more valves operable to direct coolant flow through an engine or an engine bypass to direct coolant flow through the engine. This may include opening a closed valve to allow coolant to flow through the engine, closing an open valve to block coolant flow through an engine bypass, adjusting a valve to allow coolant to flow through the engine, or combinations of these and valve adjustments. From operation procedure 300 continues conditional 340. If conditional 322 determines that an engine start is not predicted, procedure 300 continues conditional 340.

If conditional 320 determines that the engine is on, procedure 300 continues to conditional 330. When the engine is on, a mechanical coolant pump driven by the engine operates to pump coolant through a coolant flowpath. Conditional 320 determines whether the desired coolant flow rate is greater than the maximum coolant flow rate that can be provided by the mechanical coolant pump. If conditional 320 determines that the desired coolant flow rate is not greater than the maximum coolant flow, procedure 300 continues to operation 332 which provides mode II pump operation. Mode II pump operation uses the mechanical coolant pump to provide the desired rate of coolant flow without operating the electrical coolant pump. If conditional 320 determines that the desired coolant flow rate is greater than the maximum coolant flow rate that can be provided by the mechanical coolant pump, procedure 300 continues to operation 333 which provides mode III pump operation. In mode III pump operation, an electrical coolant pump is operated in combination with the mechanical coolant pump to provide the desired rate of coolant flow. From operations 332 and 333 procedure 300 continues to conditional 340.

Conditional 340 determines whether the engine temperature is below a minimum temperature effective to provide desired engine operation and/or emissions. This determination may be made based upon the temperature of the coolant, for example, the temperature of the coolant exiting the engine or at another location, the temperature of the engine oil, the temperature of the engine itself or through other measured, sensed, calculated or determined parameters providing an indication of engine temperature.

If conditional 340 determines that engine temperature is below a minimum temperature effective to provide desired engine operation and/or emissions, procedure 300 continues to operation 350. Operation 350 provides increased heating of the coolant effective to increase the engine temperature. This may be accomplished by operating one or more hybrid powertrain components to reject increased heat above that otherwise required for their commanded operation in order to transfer the increased heat to the coolant. In some embodiments this is accomplished by operating a motor/generator at reduced efficiency effective to transfer additional heat into the coolant which circulates to the engine. In other embodiments additional or alternate hybrid powertrain components may be operated at reduced efficiency to transfer additional heat into the coolant which circulates to the engine including, for example, power electronics such as inverters or converters. From operation 350, procedure 300 continues to operation 310.

If conditional 340 determines that engine temperature is not below a minimum temperature effective to provide desired engine operation and/or emissions, procedure 300 continues to operation 360. Operation 360 controls an electrical radiator fan to provide a desired rate of heat transfer from coolant to ambient. From operation 360, procedure 300 continues to operation 310.

It shall be understood that order of operations of the procedures described herein may vary from the illustrated embodiments. It shall further be understood that the logical evaluations described herein also encompass the use of functionally analogous or equivalent evaluations. Thus, where an evaluation is made to determine whether a value is less than a maximum, an analogous evaluation may be made to determine whether the value is greater than a minimum. Likewise where greater than or less than evaluations may be made, greater than or equal to or less than or equal to evaluations may be made.

Some exemplary embodiments include hybrid vehicle cooling systems comprising a closed loop coolant flowpath including at least one valve operable to direct coolant flow to an internal combustion engine or to an internal combustion engine bypass, a thermostat operable to direct coolant flow from the internal combustion engine or the internal combustion engine bypass to a radiator or a radiator bypass, a plurality of hybrid powertrain components positioned in parallel to receive coolant flow from the radiator or the radiator bypass, a mechanically driven coolant pump operable to pump coolant through the closed loop coolant flowpath, and an electrically driven coolant pump operable to pump coolant through the closed loop coolant flowpath. Certain exemplary embodiments further comprise a controller configured to control the system to operate in a first mode wherein the engine is on, the mechanically driven coolant pump operates to pump coolant through the closed loop coolant flowpath up to a threshold coolant flow rate, and the mechanically driven coolant pump and the electrically driven coolant pump operate to pump coolant through the closed loop coolant flowpath above the threshold coolant flow rate. Certain exemplary embodiments further comprise a controller configured to control the system to operate in a second mode wherein the engine is off, the mechanically driven coolant pump is off, the at least one valve directs coolant flow to the internal combustion engine bypass, and the electrically driven coolant pump operates to pump coolant through the closed loop coolant flowpath. Certain exemplary embodiments further comprise a controller operable to control the system to operate in a third mode wherein one or more of the plurality of hybrid powertrain components is controlled to heat the coolant effective to heat the engine. In certain exemplary embodiments the flowpath connects the engine or engine bypass in series with the plurality of hybrid powertrain components. In certain exemplary embodiments the plurality of hybrid powertrain components include a motor/generator, a clutch, and power electronics. In certain exemplary embodiments the mechanically driven coolant pump and the electrically driven coolant pump are positioned in series in the coolant flow path intermediate the engine and the plurality of hybrid powertrain components. Certain exemplary embodiments further comprise plurality of valves operable to direct coolant flow from the radiator or the radiator bypass to corresponding ones of the plurality of hybrid powertrain components or a hybrid powertrain component bypass. In certain exemplary embodiments the system has a required peak coolant flow rate and the maximum coolant flow rate provided by the mechanically driven coolant flow pump is less than the required peak coolant flow rate. In certain exemplary embodiments the mechanically driven coolant pump is operable to pump coolant through the engine and the electrically driven coolant pump is operable to pump coolant through the engine or the engine bypass. In certain exemplary embodiments coolant flow proceeds in series from the mechanically driven coolant pump or the electrically driven coolant pump to the engine or engine bypass to the radiator or radiator bypass to the plurality of hybrid powertrain components to the mechanically driven coolant pump or the electrically driven coolant pump.

Some exemplary embodiments include hybrid vehicle systems comprising an internal combustion engine, an electric machine, power electronics operable to provide power to the electric machine, a coolant flowpath in thermal communication with the internal combustion engine, the electric machine, and the power electronics, and a controller operable to control the electric machine and the power electronics to provide power to the electric machine, wherein the controller is operable to selectively increase the temperature of the internal combustion engine by controlling at least one of the electric machine and the power electronics to provide increased heat to the coolant. In certain exemplary embodiments the controller is operable to selectively operate an electrical coolant pump to increase coolant flow rate provided by an mechanical coolant pump driven by the internal combustion engine. In certain exemplary embodiments the controller is operable to selectively direct coolant to bypass the internal combustion engine. In certain exemplary embodiments coolant flow to the electric machine and the power electronics is in parallel. Certain exemplary embodiments further comprise a radiator wherein the coolant flowpath is routed in series through the engine, the radiator and at least one of the electric machine and the power electronics. In certain exemplary embodiments the electric machine comprises a motor/generator.

Some exemplary embodiments include methods comprising pumping coolant through a closed loop flowpath in thermal communication with an internal combustion engine, an electric motor, and power electronics, determining an engine temperature condition, and controlling operation of the electric motor or the power electronics to increase heat transfer to the coolant effective to heat the engine based upon the engine temperature condition. In certain exemplary embodiments the controlling operation of the electric motor or the power electronics to increase heat transfer to the coolant effective to heat the engine includes controlling the electric motor or the power electronics to operate at reduced efficiency. Certain exemplary embodiments further comprise operating the engine, pumping coolant through the closed loop flowpath with an engine driven coolant pump up to a threshold coolant flow rate, and pumping coolant through the closed loop flowpath with the engine driven coolant pump in combination with an additional coolant pump above the threshold coolant flow rate. Certain exemplary embodiments further comprise controlling a valve to selectively direct coolant flow through the engine or through an engine bypass. Certain exemplary embodiments further comprise pumping coolant through the closed loop flowpath with an electrically driven coolant pump and directing coolant to bypass the engine while the engine is off. Certain exemplary embodiments further comprise selectively cooling the coolant by transferring heat from the coolant with a radiator.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the invention are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hybrid vehicle cooling system comprising:
   a closed loop coolant flowpath including
      at least one valve operable to selectably direct coolant flow to an internal combustion engine or to an internal combustion engine bypass, wherein the internal combustion engine bypass is configured to bypass the coolant flow around the internal combustion engine,
      a thermostat operable to direct coolant flow from the internal combustion engine and from the internal combustion engine bypass to a radiator or a radiator bypass,
      a plurality of hybrid powertrain components and a hybrid powertrain component bypass each positioned in the closed loop coolant flowpath downstream of the radiator and the radiator bypass, wherein the plurality of hybrid powertrain components are positioned in parallel to one another and in series with the internal combustion engine and the radiator, and further comprising a plurality of control valves each associated with a respective one of the plurality of hybrid powertrain components to control coolant flow thereto;
   a mechanically driven coolant pump operable to pump coolant through the closed loop coolant flowpath; and
   an electrically driven coolant pump operable to pump coolant through the closed loop coolant flowpath, wherein the electrically driven coolant pump is positioned in series with the mechanically driven coolant pump, wherein each of the plurality of hybrid powertrain components is positioned in series with the mechanically driven coolant pump and with the electrically driven coolant pump to each selectively receive coolant flow produced by both of the electrically driven coolant pump and the mechanically driven coolant pump from the radiator or the radiator bypass.

2. A hybrid vehicle cooling system according to claim 1 comprising: a controller configured to control the system to operate in a first mode wherein the engine is on, the mechanically driven coolant pump operates to pump coolant through the closed loop coolant flowpath up to a threshold coolant flow rate, and the mechanically driven coolant pump and the electrically driven coolant pump operate to pump coolant through the closed loop coolant flowpath above the threshold coolant flow rate.

3. A hybrid vehicle cooling system according to claim 2 comprising: a controller configured to control the system to operate in a second mode wherein the engine is off, the mechanically driven coolant pump is off, the at least one valve directs coolant flow to the internal combustion engine bypass, and the electrically driven coolant pump operates to pump coolant through the closed loop coolant flowpath to bypass the mechanically driven coolant pump and the internal combustion engine.

4. A hybrid vehicle cooling system according to claim 3 comprising: a controller operable to control the system to operate in a third mode wherein one or more of the plurality of hybrid powertrain components is controlled to heat the coolant effective to heat the engine.

5. A hybrid vehicle cooling system according to claim 1 wherein the plurality of hybrid powertrain components include a motor/generator, a clutch, and power electronics that are each positioned in parallel to one another in the closed loop coolant flowpath.

6. A hybrid vehicle cooling system according to claim 1 wherein the mechanically driven coolant pump and the electrically driven coolant pump are positioned in series with one another in the coolant flow path upstream of the engine and downstream of the plurality of hybrid powertrain components and coolant flow from the plurality of hybrid powertrain components is received by the electrically driven coolant pump and supplied from the electrically driven coolant pump to the mechanically driven coolant pump and then to the engine.

7. A hybrid vehicle cooling system according to claim 1 wherein the system has a required peak coolant flow rate and the maximum coolant flow rate provided by the mechanically driven coolant flow pump is less than the required coolant flow rate.

8. A hybrid vehicle cooling system according to claim 1 wherein
the internal combustion engine bypass further bypasses the mechanically driven coolant pump and the mechanically driven coolant pump is operable to pump coolant through the engine and the electrically driven coolant pump is operable to pump coolant through the mechanically driven coolant pump and the engine or through the engine bypass.

9. A hybrid vehicle system comprising:
an internal combustion engine;
a radiator;
an electric machine;
power electronics operable to provide power to the electric machine;
a coolant flowpath in thermal communication with the internal combustion engine, the radiator, the electric machine, and the power electronics, wherein the electric machine and the power electronics are connected in parallel to one another in the coolant flowpath to each selectively receive coolant from the radiator, and the internal combustion engine and the radiator are connected in series in the coolant flowpath and in series to each of the electric machine and the power electronics, and further comprising an internal combustion engine bypass that is configured to bypass the coolant flow around the internal combustion engine and a valve operable to selectively direct coolant to the radiator through the internal combustion engine or through the internal combustion engine bypass;

a mechanically driven coolant pump to pump coolant through the internal combustion engine, wherein the internal combustion engine bypass is further configured to bypass the mechanically driven coolant pump, and an electrically driven coolant pump operable to circulate coolant through the coolant flowpath through the internal combustion engine bypass and through the mechanically driven coolant pump and the internal combustion engine, wherein each of the mechanically driven coolant pump and the electrically driven coolant pump are connected in the flow path in series to one another and in series to each of the electric machine and the power electronics to each provide coolant flow through the internal combustion engine to the radiator and from the radiator to the electric machine and the power electronics; and a controller operable to control the electric machine and the power electronics to provide power to the electric machine;
wherein the controller is operable to selectively increase the temperature of the internal combustion engine by controlling at least one of the electric machine and the power electronics to provide increased heat to the coolant in thermal communication with the internal combustion engine and by circulation of the coolant to the internal combustion engine with the at least one of the mechanically driven coolant pump and the electrically driven coolant pump.

10. A hybrid vehicle cooling system according to claim 9 wherein the controller is operable to selectively operate the electrically driven coolant pump to increase coolant flow rate provided by the mechanically driven coolant pump driven by the internal combustion engine.

11. A hybrid vehicle system according to claim 9 wherein the controller is operable to selectively direct coolant to the internal combustion engine bypass to bypass the mechanically driven coolant pump and the internal combustion engine.

12. A hybrid vehicle system according to claim 9 wherein the electric machine comprises a motor/generator.

13. A method comprising:
operating an internal combustion engine;
pumping coolant with an engine driven coolant pump up to a threshold coolant flow rate through a closed loop flowpath in thermal communication with the internal combustion engine, a radiator, an electric motor, power electronics, and an electrically driven coolant pump, wherein the internal combustion engine is connected in the flowpath in series with the radiator and each of the electric motor and the power electronics, and the electric motor and the power electronics are connected in the flowpath in parallel with one another and in series with the electrically driven coolant pump, the engine driven coolant pump, the internal combustion engine, and the radiator;
determining an engine temperature condition;
controlling operation of the electric motor or the power electronics to increase heat transfer to the coolant effective to heat the engine based upon the engine temperature condition; and
pumping coolant through the engine, the radiator and each of the electric machine and the power electronics through the closed loop flowpath with the engine driven coolant pump in conjunction with electrically driven coolant pump providing an increased coolant flow to the engine driven coolant pump above the threshold coolant flow rate.

14. A method according to claim 13 wherein the controlling operation of the electric motor or the power electronics to increase heat transfer to the coolant effective to heat the engine includes controlling the electric motor or the power electronics to increase heat rejection therefrom to the coolant by operating the electric motor or the power electronics at a reduced efficiency while meeting output demand therewith.

15. A method according to claim 13 comprising: controlling a valve to selectively direct coolant flow through the engine or through an engine bypass.

16. A method according to claim 13 comprising: pumping coolant through the closed loop flowpath with an electrically driven coolant pump and directing coolant to bypass the engine while the engine is off.

17. A method according to claim 13 comprising: selectively cooling the coolant by transferring heat from the coolant with the radiator.

18. A hybrid vehicle system according to claim 9 further comprising a clutch between the internal combustion engine and the electric machine, wherein the clutch is positioned in parallel to the electric machine and the power electronics in the coolant flowpath to selectively receive coolant from the radiator, and wherein each of the mechanically driven coolant pump and the electrically driven coolant pump are connected in the flow path in series to one another and in series to the clutch to each provide coolant flow through the internal combustion engine to the radiator and from the radiator to the clutch.

19. The method of claim 13, further comprising a clutch between the engine and the electric machine in thermal communication with the closed loop coolant flowpath, wherein the clutch is connected to the closed loop coolant flowpath in parallel with the electric motor and the power electronics, and wherein pumping coolant through the closed loop flowpath includes pumping coolant to the clutch.

* * * * *